UNITED STATES PATENT OFFICE.

PAUL BOESSNECK, OF LEIPZIG, GERMANY, ASSIGNOR TO THE FIRM OF M. B. VOGEL, OF LEIPZIG, GERMANY.

PROCESS OF MAKING ANTIMONY COMPOUNDS.

952,704.

Specification of Letters Patent. Patented Mar. 22, 1910.

No Drawing.

Application filed October 15, 1909. Serial No. 522,761.

*To all whom it may concern:*

Be it known that I, PAUL BOESSNECK, chemist, a subject of the Emperor of Germany, residing at Leipzig, in the Kingdom of Saxony, Germany, have invented certain new and useful Improvements Relating to Compounds of Antimony, of which the following is a specification.

Antimony oxid, even in freshly precipitated form, is not dissolved by acetic acid or sulfurous acid. Even if a solution of antimony trichlorid be precipitated with caustic soda and then sulfurous acid introduced or acetic acid added, no antimony oxid goes into solution. Fluorin compounds of antimony behave quite differently. If a solution of antimony trifluorid be precipitated with caustic soda and acidified with sulfurous acid or acetic acid, all the antimony oxid dissolves again. It is obvious that in this reaction double compounds of alkali fluorids with antimony sulfite or acetate are formed. The same compounds are obtained, if sulfites or acetates be added to solutions of antimony trifluorid, or if antimony oxid be dissolved in sulfurous acid or acetic acid in the presence of alkali-fluorids. Owing to their unstable composition these double compounds give up the antimony oxid to textile fibers with the most extraordinary ease, and upon this is based the great technical advantage of their use; in the bath there only remains behind the free sulfurous or acetic acid, which does not attack the fibers.

The proportions between the antimony and sulfurous or acetic acid may be varied at will, thus for example, all the fluorin of the antimony trifluorid may be replaced by sulfurous or acetic acid. As the double compounds were, however, hitherto only obtainable in solution, because they are easily decomposed and easily give off sulfurous or acetic acid, it is advisable to employ solutions acidified with sulfurous or acetic acid.

For example 126 parts, (3 molecules), of sodium fluorid are stirred up with 1000 parts of water, 150 parts, (½ molecule), of freshly precipitated antimony oxid are added and sulfurous acid introduced until solution takes place. Or 150 parts of commercial antimony oxid are dissolved in the theoretical quantity of hydrofluoric acid and a solution containing 400 parts of crystallized sodium sulfite in about 1000 parts of water and acidified with sulfurous acid is added thereto. I have found that the best results are obtained where the substances are added together at ordinary temperatures. These solutions must be kept in closed vessels, preferably in wooden casks, as they otherwise decompose with evolution of sulfurous acid.

Instead of preparing finished salts, the dry powder, as for example the salt

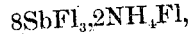

$$8SbFl_3.2NH_4Fl,$$

may be more conveniently mixed with the corresponding quantity of dehydrated sodium sulfite and some sodium bisulfite or sodium pyrosulfite added. A powder is thus obtained which contains a definite amount of antimony oxid, and which dissolves clearly in water with the formation of the desired double salts.

The compounds are suitable as substitutes for "antimony-salt," tartar emetic and lactate of antimony.

What I claim is:—

The process for the manufacture of antimony-compounds containing the whole or a part of the antimony oxid in combination with sulfurous acid, which consists in dissolving the antimony oxid in sulfurous acid in the presence of an alkali-fluorid, substantially as described.

In testimony whereof I have hereunto set my hand in presence of two subscribing witnesses.

PAUL BOESSNECK.

Witnesses:
RUDOLPH FRICKE,
SOUTHARD P. WARNER.